United States Patent
Mazyar et al.

(10) Patent No.: US 9,581,001 B2
(45) Date of Patent: Feb. 28, 2017

(54) APPARATUS AND METHODS FOR STIMULATING RESERVOIRS USING FLUIDS CONTAINING NANO/MICRO HEAT TRANSFER ELEMENTS

(71) Applicants: Oleg A. Mazyar, Houston, TX (US); Bennett M. Richard, Kingwood, TX (US)

(72) Inventors: Oleg A. Mazyar, Houston, TX (US); Bennett M. Richard, Kingwood, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 82 days.

(21) Appl. No.: 13/970,335

(22) Filed: Aug. 19, 2013

(65) Prior Publication Data

US 2015/0047847 A1    Feb. 19, 2015

(51) Int. Cl.
| | | |
|---|---|---|
| *E21B 43/25* | (2006.01) | |
| *E21B 43/24* | (2006.01) | |
| *C09K 8/592* | (2006.01) | |
| *C09K 8/92* | (2006.01) | |

(52) U.S. Cl.
CPC .............. *E21B 43/24* (2013.01); *C09K 8/592* (2013.01); *C09K 8/92* (2013.01); *E21B 43/2408* (2013.01); *E21B 43/25* (2013.01); *C09K 2208/10* (2013.01)

(58) Field of Classification Search
CPC ........ E21B 43/25; E21B 25/08; E21B 43/162; E21B 43/166; E21B 43/17; E21B 43/24; E21B 43/255; C09K 8/59; C09K 8/60; C09K 8/58; C09K 5/592; C09K 8/594; C09K 8/92
See application file for complete search history.

(56) References Cited

U.S. PATENT DOCUMENTS

| | | | | |
|---|---|---|---|---|
| 7,029,514 B1* | 4/2006 | Yang et al. | | 75/348 |
| 2006/0060998 A1* | 3/2006 | Strouse et al. | | 264/5 |
| 2007/0145326 A1* | 6/2007 | Joseph | | A61K 8/0208 252/70 |
| 2007/0278242 A1* | 12/2007 | Amundson | | A47K 10/421 221/63 |

(Continued)

FOREIGN PATENT DOCUMENTS

WO    2012057910 A2    5/2012

OTHER PUBLICATIONS

Zakaria et a.l SPE 156992 "Novel Nanoparticle-Based Drilling Fluid with Improved Characteristics" Nov. 2012, pp. 100-103, 3 pages.*

(Continued)

*Primary Examiner* — Angela M DiTrani
*Assistant Examiner* — Charles R Nold
(74) *Attorney, Agent, or Firm* — Cantor Colburn LLP

(57) ABSTRACT

In one aspect, a method of stimulating flow of a fluid present in a subsurface reservoir to a wellbore is provided, which method, in one non-limiting embodiment, may include providing a working fluid that includes a heated base fluid and heated nanoparticles, wherein the nanoparticle have a core and a shell; supplying the working fluid into a selected section of the subsurface reservoir; allowing the heated nanoparticles to transfer heat to the fluid in the subsurface reservoir to stimulate flow of the fluid from the reservoir to the wellbore.

20 Claims, 1 Drawing Sheet

(56) References Cited

U.S. PATENT DOCUMENTS

| | | | |
|---|---|---|---|
| 2008/0089836 A1* | 4/2008 | Hainfeld | 424/1.11 |
| 2008/0272331 A1 | 11/2008 | Mohapatra et al. | |
| 2011/0180238 A1* | 7/2011 | Vetrovec | F28D 15/00 165/104.28 |
| 2011/0195526 A1* | 8/2011 | Su | G01N 33/587 436/526 |
| 2011/0253370 A1* | 10/2011 | Banerjee et al. | 166/272.3 |
| 2012/0085537 A1 | 4/2012 | Banerjee et al. | |
| 2012/0216990 A1* | 8/2012 | Quintero | C09K 8/035 165/104.13 |
| 2013/0043028 A1 | 2/2013 | Chakraborty et al. | |
| 2013/0084502 A1* | 4/2013 | Singh et al. | 429/232 |
| 2013/0213638 A1* | 8/2013 | Keller et al. | 166/248 |
| 2016/0051735 A1* | 2/2016 | Slepian | A61N 1/326 600/301 |

OTHER PUBLICATIONS

Shah SPE 129539-STU "Application of Nanoparticle Saturated Injectant Gases for EOR of heavy Oils" pp. 1-12, Oct. 4, 2009.*
Sagoff, Jared; "New Nanoparticle Technology Cuts Water Use, Energy Costs," Argonne National Laboratory, Apr. 11, 2012, http://www.anl.gov/articles/new-nanoparticle-technology-cuts-water-use-energy-costs, pp. 1-3.
PCT International Search Report and Written Opinion; International Application No. PCT/US2014/046970; International Filing Date: Jul. 17, 2014; Date of Mailing: Nov. 11, 2014; pp. 1-15.

\* cited by examiner

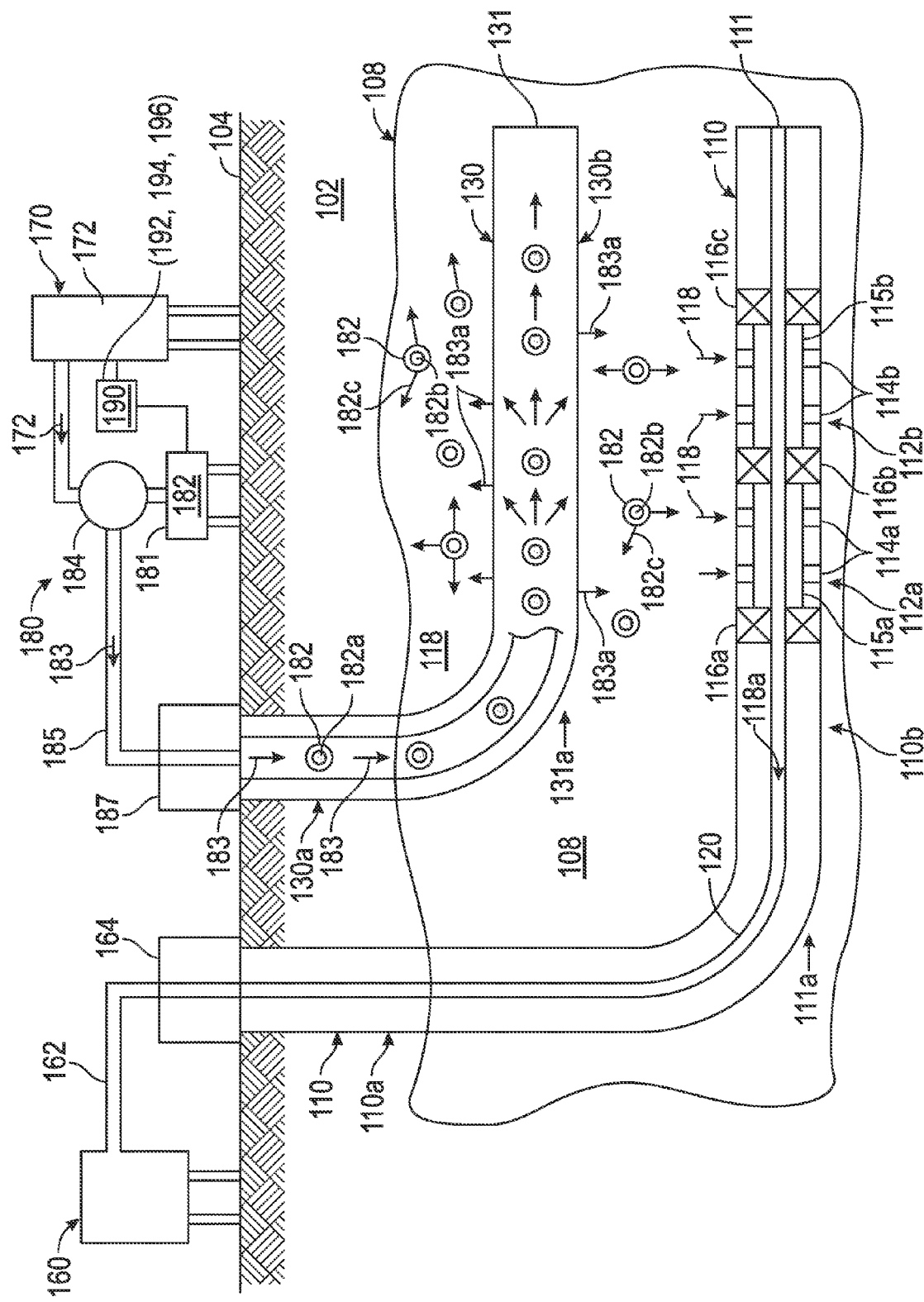

APPARATUS AND METHODS FOR STIMULATING RESERVOIRS USING FLUIDS CONTAINING NANO/MICRO HEAT TRANSFER ELEMENTS

BACKGROUND

1. Field of the Disclosure

This disclosure relates generally to apparatus and methods for stimulating operations for the production of hydrocarbons using injection of fluids that include a selected amount of nano heat transfer elements therein.

2. Background of the Art

Wellbores are drilled in subsurface formations for the production of hydrocarbons (oil and gas). Modern wells can extend to great well depths, often more than 15,000 feet. Some hydrocarbon producing zones in the earth subsurface include heavy oil (high viscosity oil) and bitumen trapped in formation with relatively low mobility. An oil bearing zone also is referred to herein as a "reservoir". Secondary operations are often performed to facilitate the flow of oil through such reservoirs. Secondary operations may include hot water injection, cyclic steam stimulation (CSS), continuous steam injection or steamflooding, steam assisted gravity drainage (SAGD), steam and gas push (SAGP), expanded solvent SAGD (ES-SAGD) and the like. In the cyclic steam stimulation process, a limited amount of steam is injected into the reservoir through the well. The injection period generally lasting one to three weeks is followed by a soaking period of few days during which time the well is shut in to allow heat transfer from the condensing steam to the reservoir fluids and the rock. Finally, the formation fluid is allowed to flow back to the well naturally, which fluid is then pumped to produce hydrocarbons. Production period usually lasts from half a year to one year per cycle. In the CSS process, several (two to three) cycles are performed in the same well, each cycle including injecting fluid and producing formation fluid. In the continuous steam injection process, steam is continuously injected into one or several wells and the formation fluid (oil) is driven to separate production wells. The injection and production wells may be vertical, deviated or horizontal wells. In the SAGD gravity drainage, steam is injected in a horizontal well located a few meters above a horizontal production typically placed or formed near the bottom of the reservoir. Steam has a tendency to rise forming a heated steam chamber while the condensate and warmed oil fall toward the production well. The unique feature of SAGD is the use of gravity as the primary force for moving oil through the formation. The efficiency of SAGD may be enhanced by adding a small amount of non-condensable gases, such as natural gas or nitrogen to steam during the middle or the late stage of the SAGD process (steam and gas push method) or by injecting a solvent in the vapor phase together with steam (ES-SAGD). Thus, in these secondary operations, generally referred to as hot fluid injection processes, heated steam is pumped into the reservoir proximate to a production well drilled into the reservoir, which well may be a vertical, deviated or horizontal well. The hot fluid heats the oil in the reservoir, reduces its viscosity, and enables it to flow from the formation into the well, from which the oil is produced to the surface. In hot fluid injection operations, heat is transferred from the injected fluid to the rock and naturally occurring fluids, including hydrocarbons, in the reservoir. The hot fluid injection applications require great amounts of hot fluids. The effectiveness of such injected fluids (steam, hot water or hot solvent) for stimulation operations depends on the heat capacity of the injected fluid. It is therefore desirable to increase the heat capacity of the fluids utilized for such stimulation applications.

The disclosure herein provides apparatus and methods that increase the heat capacity of the injection fluids by adding heated heat transfer elements or particles in a base fluid and wherein the heat transfer elements transfer heat to the fluid in the formation in addition to the heat transferred by the fluid itself. In one aspect, the heat transfer elements may include nano elements, micro elements or a combination thereof, which elements include a solid shell and an inner core that may melt or undergo another phase transition above a certain temperature.

SUMMARY

In one aspect, a method of stimulating flow of a fluid in a reservoir to a wellbore is disclosed, which method in one non-limiting embodiment may include: providing a working fluid that includes a heated base fluid and heated nanoparticles, wherein the nanoparticle have a core and a shell; supplying the working fluid into a selected section of the sub surface reservoir; allowing the heated nanoparticles to transfer heat to the fluid in the subsurface reservoir to stimulate flow of the fluid from the reservoir to the wellbore. In one aspect, the core may include bismuth and the shell made from a metallic or non-metallic material. In another aspect, the core may include a material whose melting point is less than the melting point of the shell. In another aspect, the melting point of the core is less than the temperature of the heated base fluid. In another aspect, the base fluid may be steam with another gaseous material, including but not limited to, natural gas, nitrogen, carbon dioxide, ethane, butane, and vapors of an organic solvent.

In another aspect, the disclosure provides a system for enhancing flow of a fluid present in a subsurface reservoir to a wellbore. The system, in one non-limiting embodiment, includes a unit for providing a working fluid that is a mixture or combination of a base fluid and nano-particles that include a shell and a core, wherein the working fluid is heated to a temperature sufficient to melt the core in the shell to cause the core to retain thermal energy; a unit that supplies the heated working fluid into a selected zone in the reservoir, wherein the base fluid and the heat transfer elements transfer heat to the fluid in the reservoir to aid the fluid in the reservoir to flow through the reservoir.

Examples of the more important features of a system and method for stimulating reservoirs using fluids containing nano heat transfer particles have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein:

FIG. 1 is a line diagram of an exemplary wellbore system that includes a production well and an injection well in a common reservoir for steam assisted gravity drainage operation to aid flowing of hydrocarbons from the reservoir to the production well.

DETAILED DESCRIPTION OF THE DRAWINGS

FIG. 1 is a line diagram of an exemplary wellbore system 100 that includes a production well 110 and an injection well 130 formed in a common reservoir 108 in an earth subsurface formation 102 for a steam assisted gravity drainage operation to aid the flow of hydrocarbons from the reservoir 108 to the production well 110. Wellbore 110 is shown having a vertical section 110a starting from the surface to a selected depth 111a and then a horizontal section 110b to the final well depth 111. Wellbore 130 is shown formed from the surface 104 and having a vertical section 130a to a depth 131a and then a horizontal section 130b to a depth 131. The wellbore 130 is shown placed above the wellbore 110 at a selected distance "d". Wellhead equipment 164 at the surface that includes a blowout preventer and other equipment enable fluid 118 from the wellbore 110 to flow to a processing unit 160 at the surface via a fluid line 162. Wellbore 110 is shown to include two production zones 112a and 112b separated by isolation devices, such as packers 116a, 116b, 116c etc. Fluid 118 form the reservoir 108 flows into the wellbore production zones 112a and 112b via perforations 114a and 114b respectively. Flow control devices 115a and 115b respectively may be placed in production zones 112a and 112b respectively to control the flow of the fluid 118 into the wellbore 110.

Wellbores 110 and 130 are shown formed in the reservoir 108 that contains a type of oil 118, generally referred to as "heavy oil". Heavy oil is generally very viscous and the pressure in the reservoir 108 is not sufficient to cause the oil 118 to flow from the reservoir into the wellbore 110. In such a case, some prior art methods include supplying steam, often heated up to 350° C., under pressure into the wellbore 130, also referred to as the "injection" or "secondary" wellbore. The steam disperses in the reservoir around the injection wellbore 130, thereby heating the oil 118, which reduces the viscosity of the oil and thus enables it to flow from the reservoir 108 into the production wellbore 110. In one aspect, the disclosure herein provides, in non-limiting embodiments, a method and system for supplying a heated working fluid into the wellbore 130 that includes a mixture or combination of a heated base fluid and heated heat transfer elements or particles to heat the fluid 118 in the reservoir 108 to reduce its viscosity and thereby facilitate it to move into the production wellbore 110.

In one aspect, the heat transfer elements or particles may be nanoparticles, microparticles or combination thereof. In a non-limiting embodiment, the nanoparticles include a core and a shell surrounding the core. In one aspect, the core may include a metallic material and the shell may be made from a metallic or a non-metallic material. In another aspect, the core may be bismuth and the shell made from a metallic or non-metallic material. In another embodiment, the core may be bismuth and the shell may be made from aluminum, alumina or a combination thereof. Bismuth has a melting point of 271.5° C. and density of 9.78 gm/cc at the room temperature. When solid bismuth is heated, it starts to store heat or thermal energy and its temperature rises up to its melting point. At the melting point, further introduction of heat increases the enthalpy of bismuth but its temperature remains constant until all the material has become liquid. This change in enthalpy is commonly referred to as the "enthalpy of fusion" or "heat of fusion". Once all of the bismuth has melted, further heating the liquid bismuth increases its temperature. Therefore, bismuth can be heated to a temperature above its melting point, for example 350° C., to store thermal energy, with the heat of fusion being a significant part of the total stored thermal energy. The melting point of aluminum or alumina is substantially higher than the melting point of bismuth and the steam temperature, thereby allowing the nanoparticles having bismuth as its core to be heated to an elevated temperature to store thermal energy. In one aspect, the present disclosure utilizes the stored thermal energy to discharge heat to a selected section of the reservoir to decrease the viscosity of the fluids therein, such as heavy oils, typically present as bitumen.

In one aspect, the nanoparticles having a core and a shell may be made by heating nanoparticles of a core material, such as bismuth, with triethylaluminum. Triethylaluminum decomposes above 162° C., whereas the aluminum separates from the triethylaluminum compound. When the mixture of bismuth nanoparticles and triethylaluminum is heated between the decomposition temperature of triethylaluminum and melting point of bismuth, the aluminum separates from the triethylaluminum compound. The separated aluminum then attaches to the bismuth nanoparticles forming a shell around the bismuth nanoparticles, thereby providing nanoparticles having a bismuth core and an aluminum shell. Oxygen present in the environment oxidizes at least some of the aluminum to for alumina ($Al_2O_3$), thereby providing a shell that is a combination of aluminum and alumina. If the mixture is heated to just below the melting point of bismuth, it attains its maximum volume. And when the aluminum and/or alumina attaches to bismuth nanoparticles, the cores of such nanoparticles have the maximum volume. When such core-shell particles are cooled down, the bismuth core shrinks while the aluminum/alumina shell shrinks, but less than the core. When such shell-core nanoparticles are heated to or above the melting point of bismuth, the core expands to its maximum volume within the shell until it melts and then shrinks a bit because the density of the molten bismuth (10.05 gms/cc at the melting point) is greater than the density of the solid bismuth (9.78 gms/cc at room temperature). After bismuth shrinks at the melting point, further heating of the core starts the liquid bismuth core to expand. To prevent cracking of the shell due to the expansion of the molten core, the temperature is not exceeded beyond when the volume of the molten core becomes equal to the maximum volume of the solid core when the core was contained within the alumina/aluminum shell.

To provide the working fluid for injection into the reservoir, the base material and the nanoparticles may be heated together or they may be heated separately and then combined to form the working fluid. The working fluid thus far has been described as a mixture of steam and nanoparticles having bismuth as the core and aluminum/alumina as the shell. However, for purpose of this disclosure, any suitable material may be utilized for the core and the shell. For example, the core material may include, but is not limited to, bismuth, tin, lead, salt hydrates, organic-organic materials, organic-inorganic materials, inorganic-inorganic materials, utectics, waxes, oils, fatty acids and polyglycols. The shell material may include, but is not limited to, silica, graphene, graphite, diamond-like carbon, carbon nitride, boron nitride, metals (such as aluminum, iron, nickel, cobalt, zinc), metal oxides, nitrides and carbides, or polymers that are stable at high temperatures.

The effectiveness of the base material, such as steam, hot water or hot solvent for downhole stimulation operations depends on the heat capacity of the base fluid. Additionally, effectiveness of steam-based fluids depends upon their viscosity. Addition of nanoparticles to such base fluid often results in the increase of their viscosity. Increasing the viscosity of steam-based fluids may increase the sweeping efficiency of the working fluid. The size of the nanoparticles and the core and shell materials may be selected based on the intended application. Larger cores may provide greater heat storage. However, larger particles may, in some formations, may have a greater tendency to plug the pores of the formation and thus decrease permeability. A combination of nanoparticles of sizes between 1 nanometer to 40 micrometers and between 0.01-20 percent by weight may provide sufficient heat energy storage and dispersion in formations to improve flow of heavy oils therefrom. Thus, in general, increasing the heat capacity of various stimulation fluids by adding core-shell nanoparticles, in which a solid outer coat protects an inner core that may melt above a certain temperature, may provide improved heating of the formation fluid for more efficient production of hydrocarbons therefrom. The solid cores of these particles may be made to melt during heating of a mixture of the base fluid and the nanoparticles to store some additional thermal energy. The stored thermal energy is released downhole, where the cores again solidify. The core and shell may include any suitable material. In another aspect, the dispersion quality of some nanoparticles may be improved by surface treating the shell using surfactants and/or covalently bounded functional groups.

Referring back to FIG. 1, an exemplary non-limiting method of injecting a working fluid containing a heated base fluid and heated nanoparticles to improve mobility of a downhole fluid is described in reference to system 100 of FIG. 1. The system 100 is shown to include a fluid supply unit or system 180 that includes a steam generator 170 and nanoparticle supply unit 181. In one non-limiting embodiment, the steam generator 170 supplies high temperature steam 172 and the unit 181 supplies heated nanoparticles 182. Steam 172 and nanoparticle 182 may be combined in a mixer 184 to produce the working fluid 183 containing a mixture of steam 172 and nanoparticles 182. The working fluid 183 may be supplied under pressure to the wellbore 130 via tubing 185 through a wellhead unit 187. In another aspect, the nanoparticles 182 and the steam 172 may be heated together and supplied to the wellbore 130. The working fluid 183 travels downhole via tubing 131 in the wellbore 130. The working fluid 183 is injected into the reservoir as shown by arrows 183a. For ease of explanation, the nanoparticles 182 in the working fluid 172 are shown by concentric circles, wherein the inner circle represents the core and the outer circle represents the shell. The dark inner circle, marked as 182a, represents the core in the molten state, while the hollow circle, marked as 182b, represents the core in the solid state. Arrows 182c indicate dissipation of heat from the nanoparticles 182 into the reservoir 108. The steam 172 and the nanoparticles 182 in the working fluid 183 travel into the reservoir and heat the fluid therein. The unit volume of the working fluid 183 containing the nanoparticles 182 has a higher effective heat capacity than the unit volume of a base fluid 172, thereby providing additional thermal energy to the reservoir fluid 118. The thermal energy dissipated by the nanoparticle is in addition to the thermal energy dissipated by steam, which facilitates reducing the viscosity of the fluid and thus its mobility.

A controller 190 coupled to the steam generator 172 and the nanoparticle supply unit 181 may control the amounts of steam and the nanoparticles supplied to the wellbore 130. In one aspect, the controller 190 may be a computer-based unit that includes a processor 192, a storage device 194 and programs 196 accessible to the processor for executing instructions contained in the programs 196.

Although FIG. 1 shows horizontal wellbore 110 and 130, the wells may be vertical or deviated wells. For example, the wellbore system may include one or more vertical wellbores and one or more vertical injection wells, wherein the working fluid 183 is injected into each of the injection wellbores. The working fluid will travel into the formation and facilitate movement of the reservoir fluid toward each of the production wellbores. The term "nanoparticles" herein includes both nanoparticles, microparticles or a combination thereof.

The foregoing disclosure is directed to the certain exemplary embodiments and methods. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A method of stimulating flow of a fluid present in a subsurface reservoir into a wellbore in the reservoir, the method comprising:
heating water at a surface location to a selected temperature above a temperature for forming a steam;
heating nanoparticles at the surface location, the nanoparticles having a core and a shell to store energy in the core;
mixing the steam with the heated nanoparticles at the selected temperature at a surface location to provide a working fluid, wherein the selected temperature is above a melting point of the cores of the nanoparticles and the melting point is above a downhole temperature of the reservoir;
injecting the working fluid into the subsurface reservoir; and
allowing the nanoparticles in the working fluid to transfer heat to the subsurface reservoir to stimulate flow of the fluid in the reservoir into the wellbore.

2. The method of claim 1, wherein providing heated nanoparticles comprises heating the nanoparticles to a temperature sufficient to melt the cores of the nanoparticles.

3. The method of claim 1, wherein the core comprises bismuth and the shell comprises a metal having a melting point greater than the temperature of the working fluid.

4. The method of claim 1, wherein the core comprises a material selected from a group consisting of: bismuth; a eutectic salt; a polymer, tin, lead, a salt hydrate, a wax, an oil, a fatty acid and a polyglycol.

5. The method of claim 4, wherein the shell comprises a material selected from a group consisting of: a metal; carbon; a polymer; silica; graphene; graphite; a diamond-like carbon; carbon nitride; boron nitride; iron; nickel; cobalt and zinc; a metal oxide; a nitride; and a carbide.

6. The method of claim 1, wherein providing the heated nanoparticles comprises:
providing nanoparticles of a core material having a melting point;
providing a shell material that decomposes at a temperature below the melting point of the core material; and
heating a combination of the nanoparticles and the shell material to a temperature between the decomposition temperature of the shell material and the melting point of the core material to form the nanoparticles.

7. The method of claim 1, wherein providing the heated nanoparticles comprises:
providing nanoparticles of bismuth;
providing triethylaluminum; and
heating nanoparticles of bismuth and triethylaluminum to a temperature above a decomposition temperature of triethylaluminum and below the melting point of bismuth to form nanoparticles having bismuth core and aluminum shell.

8. The method of claim 1, wherein the wellbore is a production wellbore and wherein the method further comprises:
 forming at least one injection wellbore at a selected distance from the production wellbore; and
 supplying the working fluid into the injection wellbore under pressure.

9. The method of claim 1, wherein the working fluid comprises up to about 10% of the nanoparticles by weight.

10. The method of claim 1, wherein the core has a diameter between 1 nm to 40 nm and the shell has a thickness of at least 1 nm.

11. The method of claim 1 further comprising producing the fluid from the wellbore to a surface location.

12. The method of claim 11, wherein producing the fluid from the wellbore to the surface location comprises providing a production string in the wellbore that includes one or more flow control devices that control flow of fluid from the reservoir into the wellbore.

13. A system for enhancing flow of a fluid present in a subsurface reservoir to a wellbore, comprising:
 a nanoparticle supply unit providing heated nanoparticles having a core and a shell at to store energy in the core;
 a generator for heating water at a surface location to a selected temperature above a temperature for forming a steam;
 a mixer at a surface location that mixes the heated nanoparticles with the steam at the selected temperature at the surface location to provide a working fluid, wherein the selected temperature is above a melting point of the cores of the nanoparticles and the melting point is above a downhole temperature of the subsurface reservoir;
 a wellbore that supplies the working fluid from the surface location into a selected zone in the reservoir to transfer heat stored in the nanoparticle to the fluid in the reservoir to heat the fluid in the reservoir to facilitate flow of such fluid from the reservoir to the wellbore.

14. The system of claim 13, wherein the working fluid is heated to a temperature sufficient to melt the core in the shell to cause the core to retain thermal energy.

15. The system of claim 13 further comprising an injection wellbore spaced from the wellbore and wherein the second unit supplies the working fluid under pressure to the injection wellbore.

16. The system of claim 13, wherein the core comprises a material selected from a group consisting of: bismuth; a eutectic salt; and a polymer.

17. The system of claim 16, wherein the shell comprises a material selected from a group consisting of: a metal; carbon; and a polymer.

18. The system of claim 13, wherein core has melting point lower than temperature of the heated working fluid and the shell has a melting point greater than the temperature of the heated working fluid.

19. The system of claim 13, wherein the nanoparticles are formed by: providing a shell material that decomposes at a temperature below the melting point of the core material; and heating a combination of the nanoparticles and the shell material to a temperature between the decomposition temperature of the shell material and the melting point of the core material to form the nanoparticles.

20. The system of claim 13, wherein the wellbore includes a production string that has one or more flow control devices that control flow of the fluid from the reservoir into the wellbore.

* * * * *